(12) United States Patent
Rimsa et al.

(10) Patent No.: US 7,517,924 B1
(45) Date of Patent: Apr. 14, 2009

(54) STARCH ESTER BLENDS WITH LINEAR POLYESTERS

(75) Inventors: Stephen Rimsa, Lebanon, NJ (US); Paul Tatarka, Randolph, NJ (US)

(73) Assignee: Japan Corn Starch Co., Ltd., Tokyo (JP)

( * ) Notice: Subject to any disclaimer, the term of this patent is extended or adjusted under 35 U.S.C. 154(b) by 0 days.

(21) Appl. No.: 08/367,370

(22) Filed: Dec. 30, 1994

Related U.S. Application Data

(63) Continuation of application No. 07/995,237, filed on Dec. 22, 1992, now abandoned, which is a continuation-in-part of application No. 07/957,924, filed on Oct. 7, 1992, now abandoned.

(51) Int. Cl.
*C08G 63/91* (2006.01)
*C08G 63/02* (2006.01)

(52) U.S. Cl. .................. 524/51; 525/54.42; 525/410; 523/128; 524/599

(58) Field of Classification Search ............. 525/54.42, 525/410; 523/128; 524/51, 599, 601
See application file for complete search history.

(56) References Cited

U.S. PATENT DOCUMENTS

| | | | | |
|---|---|---|---|---|
| 2,654,736 A | | 10/1953 | Caldwell et al. ........... 536/110 |
| 2,660,577 A | | 11/1953 | Kerr et al. .................. 536/110 |
| 3,038,895 A | | 6/1962 | Rutenberg et al. .......... 536/110 |
| 3,117,014 A | | 1/1964 | Klug .......................... 536/110 |
| 3,931,068 A | * | 1/1976 | Clendinning et al. .......... 524/14 |
| 4,379,138 A | | 4/1983 | Pitt et al. .................... 528/354 |
| 5,095,054 A | | 3/1992 | Lay et al. ....................... 524/47 |
| 5,205,863 A | | 4/1993 | Elion ....................... 106/154.1 |
| 5,281,691 A | * | 1/1994 | Hubbs et al. ................. 528/361 |
| 5,321,132 A | * | 6/1994 | Billmers et al. ............... 536/48 |

FOREIGN PATENT DOCUMENTS

| | | | |
|---|---|---|---|
| DE | 501 889 | | 6/1930 |
| EP | 0 394 803 | | 4/1990 |
| WO | WO 92/09654 | * | 6/1992 |
| WO | WO 92/20738 | * | 11/1992 |

OTHER PUBLICATIONS

Whistler et al. Mechanical properties of Films From Amylose, Amylopectin and Whole Starch Triesters, Industiral Eng. Chem., 36, 796-798 (1944).*
Industrial and Engineering Chemistry, vol. 49, No. 8, Aug. 1957, Ivan A. Wolff et al., "Mixed Esters of Amylose", pp. 1247-1248.
Industrial and Engineering Chemistry, vol. 43, No. 4, Apr. 1951, Ivan A. Wolff et al., "Triesters of Corn Starch, Amylose, and Amylopectin", pp. 911-914.
Polymer Bulletin, vol. 29, No. 3, Sep. 1992, Berlin, Nadia Lotti, "Miscibility of Bacterial Poly(3-Hydroxybutyrate-co-3-Hydroxy valerate) with Ester Substituted Celluloses", pp. 407-413.

* cited by examiner

*Primary Examiner*—Randy Gulakowski
*Assistant Examiner*—Alicia M Toscano
(74) *Attorney, Agent, or Firm*—Jones Day

(57) ABSTRACT

According to the present invention there is provided a composition as obtained from a melt comprising esterified starch, preferably having a degree of substitution of at least about 1.5, and preferably an amylose content of at least about 50% by weight with respect to that of the starch, and a linear polyester. The invention further provides the composition in the form of a melt or when shaped into articles.

14 Claims, No Drawings

STARCH ESTER BLENDS WITH LINEAR POLYESTERS

This application is a continuation of application Ser. No. 07/995,237, filed Dec. 22, 1992 now abandoned, which in turn is a continuation-in-part of application Ser. No. 07/957,924 filed Oct. 7, 1992 now abandoned.

FIELD OF THE INVENTION

The present invention relates to degradable polymer compositions capable of being formed by heat and pressure into articles having good dimensional stability and physical properties. These compositions comprise an esterified starch preferably an amylose content of at least about 50%, and a linear polyester.

BACKGROUND TO THE INVENTION

It is known that starch in the presence of water may be heated under pressure to form a suitable melt for the production of shaped articles. Such starch-based shaped articles may exhibit the disadvantages of relatively poor physical properties under high relative humidity and a relatively high tendency to embrittle under relatively low humidity conditions.

Attempts to overcome these problems by the replacement of the above mentioned starch by starch esters having a low degree of substitution and plasticized by water or glycerol improved the melting behaviour of the material, but the performance at low and high relative humidities remained substantially unchanged.

It is the object of the present invention to overcome, at least in part, the above mentioned disadvantages.

SUMMARY OF THE INVENTION

According to the present invention there is provided a composition as obtained from a melt comprising of an esterified starch and a linear polyester.

The starch ester may be selected from the group consisting $C_2$ to $C_{22}$-starch esters preferably from the group consisting of starch acetates, starch propionates, starch butyrates, starch pentanoates, and starch hexanoates, and mixtures thereof.

The linear polyesters may be selected from known linear polyesters, for example from those derived from hydroxycarboxylic acids and those derived from the combination of a diacid and a diol.

The esterified starch as used in this invention may be made from a starch as obtained from potatoes, rice, tapioca, maize, pea, rye, oats, barley and wheat with the respective known amylose contents. In one embodiment of the invention the starch ester is derived from a starch having an amylose content of at least about 50% by weight with respect to that of the dry starch.

The composition may further include one or more members selected from the group consisting of extenders; fillers; wood derived materials; oxides of magnesium, aluminum, silicon, and titanium; alkali and alkaline earth metal salts; lubricants; mold release agents; acid scavengers; plasticizers; UV stabilizers; coloring agents; flame retardants; antioxidants; thermal stabilizers; and mixtures thereof.

The invention further provides a composition which may be formed into articles selected for example from the group consisting of bottles, strands, sheets, films, packaging materials, pipes, tubes, lids, cups, rods, laminated films, sacks, bags, cutlery, pharmaceutical capsules, foams, granulates and powders.

The present invention further provides compositions, which may be shaped into such articles by a process selected from the group consisting of extrusion, injection molding, compression molding, filming, blow molding, vacuum forming, thermoforming, extrusion moulding, co-extrusion, foaming, profile extrusion and combinations thereof.

The invention still further provides compositions capable of being formed by heat and pressure into articles having good dimensional stability and physical properties. These compositions comprise an esterified starch, and a linear polyester. A preferred embodiment of the invention is that the esterified starch is derived from a starch having an amylose content of at least about 50% by weight with respect to the weight of the dry starch. Molded articles based on these compositions do not have a tendency to embrittle at low relative humidity and possess good mechanical properties at high relative humidity.

According to the present invention the addition of a plasticizer is eliminated, i.e. the compositions can molded without the addition of a low molecular weight plasticizer, which enhances the properties of the molded product, especially the dimensional stability at high or low relative humidities and at the same time retaining excellent biodegradability properties. Furthermore the mixing properties of the components of the inventive composition are excellent, which leads to good processing behaviour.

The present invention further provides a process for making a melt of the inventive composition as described herein, comprising heating an esterified starch, preferably having a degree of substitution of at least about 1.5 and preferably an amylose content of at least about 50% in the presence of a linear polyester as described herein to an elevated temperature and plastifying the thus heated composition until a uniform melt is obtained.

The present invention further refers to the use of a linear polyester as described herein as a plasticiser for an esterified starch in the process of melt formation.

The present invention will be further apparent from the following description taken in conjunction with the accompanying examples and appended claims.

DETAILED DESCRIPTION OF THE INVENTION

According to the present invention there is provided a composition as obtained from a melt comprising of esterified starch and a linear polyester.

The esterified starch may be selected from the group consisting $C_2$ to $C_{22}$-starch esters and preferably is a $C_2$ to $C_8$-starch esters.

It is particularly preferred that the esterified starch is selected from the group consisting of starch acetates, starch propionates, starch butyrates, starch pentanoates, and starch hexanoates, and mixtures thereof. The most preferred are the esters having more than two carbon atoms in the carbonyl residue.

The starch ester may be a mixed ester, i.e. may contain at least two different ester residues attached to the same starch molecule. It is preferred that such mixed esters comprise at least two members selected from the group consisting of acetate, propionate, butyrate, pentanoate, hexanoate, heptanoate, and octanoate residues bound to the same starch molecule.

Particularly preferred mixed starch diesters comprise of both acetate and propionate groups or both acetate and butyrate groups or both propionate and butyrate groups bound to the same starch molecule.

Furthermore, the starch ester may be a physical blend of at least two different starch esters. It is most preferred that such physical blends of starch esters comprise at least two members with different degrees of substitution selected from the group consisting of starch acetates, starch propionates, starch butyrates, starch pentanoates, and starch hexanoates; or at least two members whereby each member is selected from a different group of said starch esters, the at least one members having the same or a different degree of substitution.

In the case of mixed starch diesters, the ratio of the types of ester groups comprised by the starch ester may vary greatly, but is in the range of about 1:1 to about 1:20, preferably in the range of 1:10 to about 1:20, and more preferably in the range of 1:15 to about 1:20. This means that if the intention is to prepare substantially a starch acetate, the starch acetate predominantly contains acetate groups and for example about 5 to about 20 mol % of propionate groups with respect to all the ester groups present. On the other hand if the intention is to produce substantially a starch propionate, then the acetate ester group or any other ester group will be present in an amount of about 5 to about 20 mol % with respect to all the ester groups present. Mixed esters are of higher importance for acetates and propionate and less important for starch esters with $C_4$ to $C_{22}$-ester residues. The total degree of substitution of the esterified starch is from about 1.5 to about 2.9, and it is more preferred that this degree of substitution is from 1.8 to about 2.9, independent of the type of substitution. The most preferred degree of substitution is from about 1.8 to about 2.5. Examples of starch esters are given in Table 1.

TABLE 1

| Example No. | starch type | ester type | DS |
|---|---|---|---|
| 1. | corn | acetate | 1.75 |
| 2. | corn | acetate | 2.58 |
| 3. | corn | propionate | 1.84 |
| 4. | corn | propionate | 2.47 |
| 5. | Hylon VII* | acetate | 1.83 |
| 6. | Hylon VII* | acetate | 2.34 |
| 7. | Hylon VII* | acetate | 2.81 |
| 8. | Hylon VII* | propionate | 1.89 |
| 9. | Hylon VII* | propionate | 2.55 |

DS = degree of substitution
*Hylon VII is a high amylose corn starch with an amylose content of about 70%, sold by National Starch and Chemical Co, USA.

Examples of mixed starch esters are given in Table 2.

TABLE 2

| Ex.Nr. | starch type | amylose content | ester type (1) | ester type (2) | ratio ester 1: ester 2 | total DS* |
|---|---|---|---|---|---|---|
| 10. | corn | 27% | acetate | pro'ate | 25:75 | 2.36 |
| 11. | corn | 27% | acetate | pro'ate | 50:50 | 1.85 |
| 12. | corn | 27% | acetate | pro'ate | 75:25 | 1.60 |
| 13. | corn | 27% | acetate | but'ate | 05:95 | 1.82 |
| 14. | corn | 27% | acetate | but'ate | 40:60 | 2.05 |
| 15. | corn | 27% | acetate | but'ate | 95:05 | 2.59 |
| 16. | corn** | 70% | acetate | pro'ate | 25:75 | 2.06 |
| 17. | corn** | 70% | acetate | pro'ate | 50:50 | 1.84 |
| 18. | corn** | 70% | acetate | pro'ate | 75:25 | 1.77 |
| 19. | corn** | 70% | acetate | but'ate | 05:95 | 1.87 |
| 20. | corn** | 70% | acetate | but'ate | 40:60 | 2.06 |
| 21. | corn** | 70% | acetate | but'ate | 95:05 | 2.73 |

*degree of substitution
corn** = Hylon VII
pro'ate = propionate
but'rate = butyrate Within the scope of this invention, any type of commercially available starch to produce the esterified starch may be used such as native starch selected from potatoes, rice, tapioca, maize, pea, rye, oats, barley and wheat. A preferred embodiment of the invention is that the amylose content of the starch is at least about 50% and preferably higher than this, typically being in excess of about 70% by weight with respect to that of the dry starch.

A highly suitable starch is the high amylose genetically modified corn starch, Hylon® VII, having an amylose content of about 70%, available from National Starch and Chemical Company, Bridgewater, N.J. 08807, USA. Such starch is subsequently esterified, e.g. acetylated or propionated to a degree of substitution of at least 1.5 and preferably 1.8.

A particularly suitable esterified high amylose starch is Hylon VII acetylated or propionated, preferably propionated, to a 2.4 degree of substitution.

Particularly suitable esterified high amylose starch mixed esters are acetate and propionate in a 1:10 ratio, preferably in a 1:15 to a 1:20 ratio.

The linear polyesters as used in the present invention may be of the type as derived from hydroxy-carboxylic acids. Said hydroxy-carboxylic acids correspond to the general formula:

$$HO-(C_nH_{2n})-COOH \quad (1)$$

where n is an integer from 1 to 21, preferably an integer from 1 to 7, and more preferably is 1, 2, 3, 4 or 5.

Such acids are for example glycolic acid (n=1), lactic acid (n=2 and wherein the hydroxyl group is fixed in the alpha-position), hydroxy butyric acid and hydroxy isobutyric acid (n=3), hydroxy valeric acid (n=4), hydroxy caproic acid (n=5) where in each case the hydroxy group is fixed in the terminal position.

Methods for the preparation of linear polyesters of the type as derived from such hydroxy-carboxylic acid are known in the art. Many of these hydroxy-carboxylic acids are known to form a cyclic ester, i.e. a lactone, which is preferably used for producing the corresponding polyester. Hydroxy-caproic acid for example forms a cyclic ester known as 6-caprolactone, which can be polymerized as such. Such lactones are known. Preferred from such polylactones is poly(6-caprolactone).

The linear polyesters, derived from the combination of a diacid and a diol, as used in the present invention may be described by the following formula:

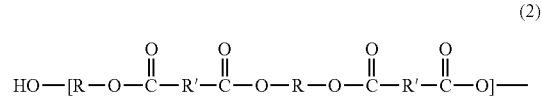

(2)

where R is an aliphatic hydrocarbon residue with 2, 4 or 6 carbon atoms; and R' is an aliphatic saturated or unsaturated divalent hydrocarbon residue with 2 to 22 carbon atoms.

Examples of preferred linear polyesters can be described by the following formula:

(3)

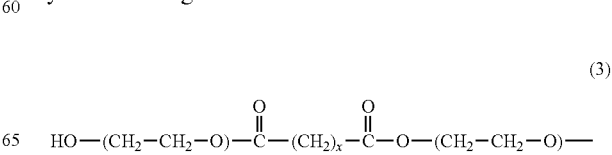

wherein x is 2 (poly(ethylene succinate)) or x is 4 (poly(ethylene adipate)).

The linear polyesters as used in the present invention may be, as mentioned, derived from a hydroxy-carboxylic acid or a mixture of such acids or from a corresponding lactone or a mixture of such lactones. The linear polyesters may also be a physical mixture of different polyester types. Examples of such linear polyesters include poly(3-propiolactone), poly(5-valerolactone), poly(6-caprolactone), poly(6-decalactone), poly(7-enamtholactone), poly(8-caprylolactone), poly(12-laurolactone), poly(15-pentadodecanolactone), poly(hydroxybutyrate), poly(hydroxyvalerate). Preferred from these are poly(3-propiolactone), poly(5-valerolactone), poly(6-caprolactone), poly(hydroxybutyrate), poly(hydroxyvalerate) and poly(hydroxybutyrate-co-valerate) and mixtures thereof. Still more preferred are poly(5-vaierolactone), poly(6-caprolactone), poly(hydroxybutyrate), poly(hydroxyvalerate) and poly(hydroxybutyrate-co-valerate) and mixtures thereof. Most preferred are poly(6-caprolactone), poly(hydroxybutyrate-co-valerate), and mixtures thereof.

Preferred examples of linear polyesters, derived from the combination of a diacid and a diol, as used in the present invention are poly(ethylene succinate), poly(ethylene adipate), and mixtures thereof. Preferred from this polyester type is poly(ethylene succinate).

These linear polyesters generally have a weight average molecular weight greater than 10,000. The poly(caprolactone) for example may have an average molecular weight from about 10,000 to about 250,000.

The linear polyester as used in this invention may be present in the composition in a amount of from 10 to 95% by weight with respect to that of the composition, but preferably is present in the composition in an amount of from 20 to 75% by weight with respect to that of the composition. Most preferably the linear polyester is present in an amount of about 25 to 55% by weight of the total composition. It is within the knowledge of the persons skilled in the art to optimize the concentration for each linear polyester type used.

The poly(6-caprolactone), for example, is present in the composition preferably in the amount of from 10 to 95% by weight with respect to that of the composition, preferably in an amount of from about 20 to 75% by weight with respect to that of the total composition. Most preferably poly(6-caprolactone) is present in an amount of about 25 to 55% by weight of the total composition.

A most particularly preferred composition according to the present invention comprises a Hylon-VII propionate having a degree of substitution of about 1.1-1.5, most preferably 1.37, and a polycaprolactone which is present in the composition in an amount of at least 35 weight percent, preferably at least 50% with respect to the total composition.

Plasticizers used in this invention include, but are not limited to glyceryl triacetate, triethyl citrate, acetyl triethyl citrate, tributyl citrate, acetyl tributyl citrate, diethyl phthalate, glyceryl tribenzoate, N-ethyl-o,p-toluene sulfonamide, dimethyl sebacate, dibutyl sebacate, pentaerythritol tetraacetate, pentaerythritol tetrabenzoate, and diethyl succinate.

Preferred from these are glyceryl triacetate, acetyl triethyl citrate, triethyl citrate, tributyl citrate, dimethyl sebacate, N-ethyl-o,p-toluene sulfonamide, and diethyl succinate. And most preferred are glyceryl triacetate, N-ethyl-o,p-toluene sulfonamide, acetyl triethyl citrate.

The plasticizers as used in this invention may be present in the composition in a amount of from 1 to 50% by weight with respect to that of the composition, but preferably is present in the composition in an amount of from 3 to 40% by weight with respect to that of the composition. Most preferably the plasticizer is present in an amount of about 5 to 30% by weight of the total composition. It is within the knowledge of the persons skilled in the art to optimize the concentration for each plasticizer used.

N-ethyl-o,p-toluene sulfonamide, for example, is present in the composition preferably in the amount of from 1 to 50% by weight with respect to that of the composition, preferably in an amount of from about 3 to 40% by weight with respect to that of the total composition. Most preferably N-ethyl-o,p-toluene sulfonamide is present in an amount of about 5 to 30% by weight of the total composition.

The composition according to this invention may further comprise, in an amount up to 60% by weight, preferably in an amount up to 35% by weight and most preferably in an amount up to 25% by weight of the total composition, one or more hydrophobic thermoplastic polymer(s). The preferred lower limit is 5% by weight and preferably 8% by weight of the total composition. Preferred are such polymers containing polar groups such as hydroxyl, ether-, acid or ester groups. Such polymers are preferably selected from the group consisting of copolymers of ethylene, propylene or isobutylene such as ethylene/vinyl acetate-copolymars (EVA), ethylene/vinyl alcohol-copolymers (EVOH), ethylene/acrylic acid-copolymers (EAA), ethylene/ethyl acrylate-copolymers (EEA), ethylene/methacrylate-copolymers (EMA).

The composition may further include one or more members selected from the group consisting of extenders; fillers; wood derived materials; oxides of magnesium, aluminum, silicon, and titanium; alkali and alkaline earth metal salts; lubricants; mold release agents; acid scavengers; UV stabilizers; coloring agents; flame retardants; antioxidants; thermal stabilizers; and mixtures thereof.

The composition further may comprise a native starch selected from and/or a chemically modified (non esterified) starch derived from potatoes, rice, tapioca, corn, pea, rye, oats, and wheat.

The preferred thermal stabilizer and mold release agent are respectively butylated hydroxytoluene and stearyl stearamide which may be present in the composition in amounts respectively of from about 0.1 to about 2.5%. and from about 0.1 to about 1.5% with respect to the total formulation.

The present inventive composition may be prepared as follows, but not limited to, pre-blending the components of each blend in a suitable intensive mixer, such as a Henschel; heating sufficiently and melt-mixed using a 25 mm Berstorff co-rotating twin-screw extruder; cooling and pelletizing the extrudate with equipment typically found in thermoplastic compounding.

The composition according to this invention may be formed into articles selected for example from the group consisting of bottles, strands, sheets, films, packaging materials, pipes, tubes, lids, cups, rods, laminated films, sacks, bags, cutlery, pharmaceutical capsules, foams, granulates and powders. The following Examples also demonstrate the extrusion and injection mouldability of the present inventive compositions, which may be shaped into such articles by a process selected from the group consisting of extrusion, injection molding, compression molding, filming, blow molding, vacuum forming, thermoforming, extrusion moulding, co-extrusion, foaming, profile extrusion and combinations thereof.

ASTM (ASTM type I) tensile bars test specimens were molded on a 1.0 ounce Arburg 170 CMD injection molding machine using a mold suitable for commercial thermoplastic materials.

All samples were conditioned for two weeks at 10, 50, and 90 percent relative humidity and 25° C.

All mechanical tests were performed under ASTM D-638 protocols. Water content was determined by the Karl Fisher titration method.

Mechanical properties of the Examples are summarized in Tables 3 and 4. The invention will be further apparent from the following Examples.

EXAMPLE 1

A blend consists of 80.0 percent of high amylose starch propionate with a 2.4 degree of substitution and 20.0 percent of low molecular weight (average molecular weight about 40,000) poly(6-caprolactone) and stabilized and lubricated with 1.0 percent of Boeson (mixture of mono, di, and triglyerides) and 0.5 percent lecithin (phosphatide). As the relative humidity increases, this material surprisingly retains much of its stiffness.

EXAMPLE 2

A blend consists of 74.1 percent of high amylose starch propionate with a 2.4 degree of substitution and 25.9 percent of low molecular weight (average molecular weight about 40,000) poly(6-caprolactone) and stabilized and lubricated with the same type as disclosed in Examples 1. As the relative humidity increases, this material, retains much of its stiffness. The approximately five percent increase in the amount of low molecular weight poly(6-caprolactone) significantly reduces the injection molding pressure necessary to make satisfactory molded articles without deleterious impact on mechanical properties.

EXAMPLES 3-6

Blends consist of between 60 and 75 percent of high amylose starch propionate with a 2.4 degree of substitution and between 25 and 40 percent of high molecular weight (average molecular weight about 70,000) poly(6-caprolactone) and stabilized and lubricated with 0.5 percent butylated hydroxytoluene and 0.3 percent stearyl stearamide with respect to the total formulation. As the relative humidity increases, these materials retain much of the stiffness. The glass transition temperature is not changed significantly by the increase in the level of the high molecular weight poly(6-caprolactone), however, toughness and ductility significantly improves without deleterious impact on stiffness and rigidity.

EXAMPLE 7

A blend consists of 70 percent of high amylose starch propionate with a 2.3 degree of substitution, 25 percent of a high molecular weight (average molecular weight about 70,000) poly(6-caprolactone), and 5 percent of N-ethyl-o,p-toluene sulfonamide and stabilized and lubricated with the same type and level of additives as disclosed in Examples 3-6. The addition of N-ethyl-o,p-toluene sulfonamide significantly reduces the injection molding pressure necessary to make satisfactory molded articles without deleterious impact on mechanical properties or sensitivity towards changes in relative humidity.

EXAMPLE 8

A blend consists of 70 percent of high amylose starch propionate with a 2.3 degree of substitution and 30 percent of a hydroxybutyrate homopolymer and stabilized and lubricated with the same type and level of additives as disclosed in Examples 3-6.

EXAMPLE 9

A blend consists of 70 percent of high amylose starch propionate with a 2.3 degree of substitution and 30 percent of a hydroxybutyrate-hydroxyvalerate copolymer and stabilized and lubricated with the same type and level of additives as disclosed in Example 8.

EXAMPLE 10

A blend consists of 70 percent of high amylose starch propionate with a 2.3 degree of substitution and 30 percent of poly(ethylene succinate) and stabilized and lubricated with the same type and level of additives as disclosed in Example 8.

It will be appreciated that it is not intended to limit the invention to the above examples only, many variations thereto and modifications thereof being possible to one skilled in the art without departing from the scope of the invention, which is defined by the appended claims.

TABLE 3

PROCESSING CONDITIONS

| INGREDIENTS (wt. %) | EXAMPLE | | | | | | | | |
|---|---|---|---|---|---|---|---|---|---|
| | 1 | 2 | 3 | 4 | 5 | 6 | 7 | 8 | 9 |
| 2.4 D.S. STARCH PROPIONATE | 80.00 | 74.10 | 75.00 | 70.00 | 65.00 | 60.00 | | | |
| 2.3 D.S. STARCH PROPIONATE | | | | | | | 70.00 | 70.00 | 70.00 |
| GLYCERYL TRIACETATE | | | | | | | | | |
| LOW MOLECULAR WEIGHT POLY (6-CAPROLACTONE) | 20.00 | 25.90 | | | | | | | |
| HIGH MOLECULAR WEIGHT POLY (6-CAPROLACTONE) | | | 25.00 | 30.00 | 35.00 | 40.00 | 25.00 | | |
| N-ETHYL O,P-TOLUENE SULFONAMIDE | | | | | | | 5.00 | | |
| HYDROXYBUTYRATE HOMOPOLYMER | | | | | | | | 30.00 | |
| HYDROXYBUTYRATE-HYDROXYVALERATE COPOLYMER | | | | | | | | | 30.00 |
| BOESON | 0.67 | 0.67 | | | | | | | |
| LECITHIN | 0.33 | 0.33 | | | | | | | |
| BUTYLATED HYDROXYTOLUENE | | | 0.50 | 0.50 | 0.50 | 0.50 | 0.50 | 0.50 | 0.50 |
| STEARYL STEARAMIDE | | | 0.30 | 0.30 | 0.30 | 0.30 | 0.30 | 0.30 | 0.30 |

TABLE 3-continued

PROCESSING CONDITIONS

| INGREDIENTS (wt. %) | EXAMPLE | | | | | | | | |
|---|---|---|---|---|---|---|---|---|---|
| | 1 | 2 | 3 | 4 | 5 | 6 | 7 | 8 | 9 |
| EXTRUSION PROCESSING CONDITIONS | | | | | | | | | |
| ZONE TEMP. (C.) | | | | | | | | | |
| B2 | 80 | 80 | 89 | 80 | 80 | 91 | 92 | 95 | 94 |
| B3 | 175 | 175 | 150 | 150 | 150 | 150 | 150 | 215 | 195 |
| B4 | 180 | 180 | 181 | 180 | 175 | 180 | 170 | 215 | 195 |
| B5 | 165 | 165 | 171 | 170 | 165 | 170 | 160 | 205 | 190 |
| B6 | 165 | 165 | 171 | 170 | 165 | 170 | 160 | 205 | 190 |
| B7 | 160 | 160 | 171 | 170 | 165 | 170 | 160 | 200 | 190 |
| B8 | 160 | 160 | 171 | 170 | 165 | 170 | 160 | 200 | 190 |
| DIE | 160 | 160 | 174 | 170 | 165 | 170 | 160 | 200 | 190 |
| MELT TEMP (C.) | 176 | 175 | 174 | 172 | 168 | 176 | 167 | 210 | 192 |
| SCREW SPEED (rpm) | 125 | 124 | 157 | 158 | 156 | 155 | 402 | 200 | 175 |
| DIE PRESS. (psi) | 510 | 430 | 425 | 410 | 460 | 530 | 380 | 110 | 160 |
| AMPS | 11.8 | 10.8 | 9.7 | 9.1 | 9.9 | 14.9 | 10.1 | 7.7 | 6.5 |
| INJECTION MOLDING CONDITIONS | | | | | | | | | |
| BARREL TEMP. (C.) | | | | | | | | | |
| ZONE NR. 1 | 149 | 160 | 155 | 155 | 144 | 154 | 154 | 167 | 127 |
| ZONE NR. 2 | 183 | 183 | 171 | 170 | 165 | 171 | 171 | 193 | 154 |
| ZONE NR. 3 | 183 | 183 | 171 | 170 | 165 | 171 | 171 | 193 | 154 |
| NOZZLE | 188 | 188 | 171 | 170 | 162 | 171 | 171 | 193 | 151 |
| MOLD | 66 | 66 | 38 | 38 | 38 | 38 | 38 | 44 | 44 |
| INJ. PRESS. (psi) | 13,775 | 10,875 | 17,400 | 17,400 | 17,400 | 16,170 | 12,863 | 5,880 | 12,495 |
| INJ. VEL. (CCM/S) | 6.0 | 7.0 | 10.0 | 10.0 | 9.0 | 8.0 | 8.0 | 10.0 | 10.0 |
| COOLING TIME (s) | 20 | 25 | 12 | 12 | 12 | 20 | 12 | 18 | 18 |
| CYCLE TIME (s) | 46.6 | 48.9 | 30.8 | 35.6 | 36.6 | 37.4 | 37.4 | 44.0 | 38.3 |

TABLE 4

MECHANICAL PROPERTIES vs. RELATIVE HUMIDITY

| INGREDIENTS (wt. %) | EXAMPLE | | | | |
|---|---|---|---|---|---|
| | 1 | 2 | 3 | 4 | 5 |
| 2.4 D.S. STARCH PROPIONATE | 80.00 | 74.10 | 75.00 | 70.00 | 65.00 |
| 2.3 D.S. STARCH PROPIONATE | | | | | |
| GLYCERYL TRIACETATE | | | | | |
| LOW MOLECULAR WEIGHT POLY(6-CAPROLACTONE) | 20.00 | 25.90 | | | |
| HIGH MOLECULAR WEIGHT POLY(6-CAPROLACTONE) | | | 25.00 | 30.00 | 35.00 |
| POLY(ETHYLENE SUCCINATE) | | | | | |
| N-ETHYL O,P-TOLUENE SULFONAMIDE | | | | | |
| HYDROXYBUTYRATE HOMOPOLYMER | | | | | |
| HYDROXYBUTYRATE-HYDROXYVALERATE COPOLYMER | | | | | |
| BOESON | 0.67 | 0.67 | | | |
| LECITHIN | 0.33 | 0.33 | | | |
| BUTYLATED HYDROXYTOLUENE | | | 0.50 | 0.50 | 0.50 |
| STEARYL STEARAMIDE | | | 0.30 | 0.30 | 0.30 |
| 10% RELATIVE HUMIDITY | | | | | |
| WATER CONTENT (%) | 0.7 | 0.5 | 0.6 | 0.4 | 0.4 |
| YOUNG'S MODULUS (psi) | 245,100 | 232,700 | 252,800 | 222,600 | 204,400 |
| STRESS AT YIELD (psi) | — | — | 5,282 | 4,706 | 4,461 |
| STRAIN AT YIELD (%) | — | — | 5.4 | 6.0 | 6.6 |
| STRESS AT BREAK (psi) | 4,923 | 4,440 | 4,901 | 4,255 | 3,455 |
| STRAIN AT BREAK (%) | 3.2 | 3.2 | 7.3 | 15.4 | 63.8 |
| ENERGY TO BREAK (lbs-in.) | — | — | 29.3 | 80.4 | 221.2 |
| 50% RELATIVE HUMIDITY | | | | | |
| WATER CONTENT (%) | 1.7 | 1.7 | 1.5 | 1.4 | 1.3 |
| YOUNG'S MODULUS (psi) | 222,100 | 216,000 | 232,400 | 210,700 | 196,800 |
| STRESS AT YIELD (psi) | 4,737 | 4,495 | 4,678 | 4,250 | 4,079 |
| STRAIN AT YIELD (%) | 5.0 | 5.4 | 5.2 | 5.9 | 6.6 |
| STRESS AT BREAK (psi) | 3,625 | 4,338 | 3,452 | 3,245 | 3,174 |
| STRAIN AT BREAK (%) | 36.9 | 9.5 | 53.1 | 87.7 | 89.1 |
| ENERGY TO BREAK (lbs-in.) | — | — | 197.0 | 295.3 | 285.5 |

TABLE 4-continued

MECHANICAL PROPERTIES vs. RELATIVE HUMIDITY

90% RELATIVE HUMIDITY

| | | | | | |
|---|---|---|---|---|---|
| WATER CONTENT (%) | 3.8 | 3.7 | 4.4 | 4.0 | 3.7 |
| YOUNG'S MODULUS (psi) | 193,700 | 197,400 | 188,100 | 163,400 | 166,800 |
| STRESS AT YIELD (psi) | 3,748 | 3,553 | 3,423 | 3,131 | 3,142 |
| STRAIN AT YIELD (%) | 4.2 | 4.6 | 4.3 | 6.1 | 5.6 |
| STRESS AT BREAK (psi) | 3,438 | 2,802 | 2,305 | 2,273 | 2,483 |
| STRAIN AT BREAK (%) | 13.2 | 43.9 | 54.2 | 94.4 | 112.3 |
| ENERGY TO BREAK (lbs-in.) | — | — | 144.8 | 241.0 | 281.4 |
| AS-MOLDED | | | | | |
| WATER CONTENT (%) | | | 1.3 | 1.2 | 1.3 |
| Tg (deg. C.) | | | 118 | 119 | 115 |

| | EXAMPLE | | | | |
|---|---|---|---|---|---|
| INGREDIENTS (wt. %) | 6 | 7 | 8 | 9 | 10 |
| 2.4 D.S. STARCH PROPIONATE | 60.00 | | | | |
| 2.3 D.S. STARCH PROPIONATE | | 70.00 | 70.00 | 70.00 | 70.00 |
| GLYCERYL TRIACETATE | | | | | |
| LOW MOLECULAR WEIGHT POLY(6-CAPROLACTONE) | | | | | |
| HIGH MOLECULAR WEIGHT POLY(6-CAPROLACTONE) | 40.00 | 25.00 | | | |
| POLY(ETHYLENE SUCCINATE) | | | | | 30.00 |
| N-ETHYL O,P-TOLUENE SULFONAMIDE | | 5.00 | | | |
| HYDROXYBUTYRATE HOMOPOLYMER | | | 30.00 | | |
| HYDROXYBUTYRATE-HYDROXYVALERATE COPOLYMER | | | | 30.00 | |
| BOESON | | | | | |
| LECITHIN | | | | | |
| BUTYLATED HYDROXYTOLUENE | 0.50 | 0.50 | 0.50 | 0.50 | 0.50 |
| STEARYL STEARAMIDE | 0.30 | 0.30 | 0.30 | 0.30 | 0.30 |
| 10% RELATIVE HUMIDITY | | | | | |
| WATER CONTENT (%) | 0.4 | 0.4 | 0.4 | 0.6 | 0.5 |
| YOUNG'S MODULUS (psi) | 204,600 | 233,600 | 230,000 | 310,000 | 195,400 |
| STRESS AT YIELD (psi) | 4.291 | 4.309 | — | — | 3,930 |
| STRAIN AT YIELD (%) | 6.5 | 4.6 | — | — | 6.0 |
| STRESS AT BREAK (psi) | 3,315 | 3,150 | 2,500 | 2,615 | 3,165 |
| STRAIN AT BREAK (%) | 92.9 | 26.6 | 1.4 | 0.9 | 73.8 |
| ENERGY TO BREAK (lbs-in.) | 308.7 | 90.4 | 1.6 | 0.9 | 247.2 |
| 50% RELATIVE HUMIDITY | | | | | |
| WATER CONTENT (%) | 1.2 | 1.4 | 1.5 | 1.4 | 1.6 |
| YOUNG'S MODULUS (psi) | 190,500 | 213,900 | 130,000 | 274,000 | 176,200 |
| STRESS AT YIELD (psi) | 3,916 | 3,716 | — | — | 3,412 |
| STRAIN AT YIELD (%) | 6.5 | 4.5 | — | — | 6.3 |
| STRESS AT BREAK (psi) | 3,029 | 2,760 | 1,984 | 1,502 | 3,089 |
| STRAIN AT BREAK (%) | 117.5 | 74.2 | 1.2 | 0.5 | 91.7 |
| ENERGY TO BREAK (lbs-in.) | 355.4 | 208.2 | 1.3 | 0.4 | 317.4 |
| 90% RELATIVE HUMIDITY | | | | | |
| WATER CONTENT (%) | 3.5 | 4.1 | 4.2 | 4.3 | 5.1 |
| YOUNG'S MODULUS (psi) | 155,500 | 143,400 | 70,000 | 200,000 | 151,500 |
| STRESS AT YIELD (psi) | 2,935 | 2,521 | — | — | 2,692 |
| STRAIN AT YIELD (%) | 6.6 | 4.2 | — | — | 6.0 |
| STRESS AT BREAK (psi) | 2,443 | 1,821 | 477 | 1,012 | 2,119 |
| STRAIN AT BREAK (%) | 209.8 | 87.8 | 0.4 | 0.5 | 121.2 |
| ENERGY TO BREAK (lbs-in.) | 504.0 | 172.2 | 0.2 | 0.3 | 325.0 |
| AS-MOLDED | | | | | |
| WATER CONTENT (%) | 0.5 | 0.5 | 0.6 | 0.5 | 0.4 |
| Tg (deg. C.) | 117 | 98 | 119 | 12 | 75 |

What we claim is:

1. A biodegradable moldable product or film product prepared from a compatible blend comprising a biodegradable, hydrophobic, water-repellant, amorphous starch ester having a degree of substitution of about 1.1 to about 2.5 DS and a biodegradable polyester selected from the group consisting of poly(6-caprolactone), poly(lactic acid), poly(glycolic acid), poly(hydroxy butyric acid), poly(hydroxy isobutyric acid), poly(hydroxy valeric acid), poly(hydmxybutyrate-co-valerate) and polyesters derived from hydroxy-carboxylic acids having the formula:

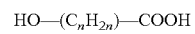

HO—$(C_nH_{2n})$—COOH where n is an integer from 1 to 21.

2. A product as set forth in claim 1 wherein said starch ester has an amylose content of at least about 50%.

3. A product as set forth in claim 1 wherein said starch ester has an amylose content of at least about 70%.

4. A product as set forth in claim 1 wherein said starch ester has a degree of substitution of 1.1 to 1.75DS.

5. A product as set forth in claim 1 wherein said starch ester is an ester of a starch selected from the group consisting of corn starch, potato starch, tapioca starch, rice starch and wheat starch.

6. A product as set forth in claim 1 further including a plasticizer.

7. A product as set forth in claim 6 wherein the plasticizer is selected from the group consisting of glyceryl triacetate, triethyl citrate, acetyl triethyl citrate, tributyl citrate, acetyl tributyl citrate, diethyl phthalate, glyceryl tribenzoate, N-ethyl-o,p-toluene sulfonamide, dimethyl sebacate, dibutyl sebacate, pentaerythritol tetraacetate, pentaerythritol tetrabenzoate, and diethyl succinate.

8. A moldable composition comprising a compatible thermoplastic blend of a biodegradable, hydrophobic, water-repellant, amorphous starch ester having a degree of substitution of about 1.1 to about 2.5 DS and a biodegradable polyester selected from the group consisting of poly(6-caprolactone), poly(lactic acid), poly(glycolic acid), poly(hydroxy butyric acid), poly(hydroxy isobutyric acid), poly(hydroxy valeric acid), poly(hydroxybutyrate-co-valerate) and polyesters derived from hydroxy-carboxylic acids having the formula:

HO—$(C_nH_{2n})$—COOH where n is an integer from 1 to 21.

9. A compostion of claim 8 in which said starch ester has an amylose content of at least about 50%.

10. A compostion of claim 8 which contains a filler.

11. A molded product formed by heating a composition of claim 8 so that it is thermoplastic and then shaping it into a product.

12. A method of forming a product which comprises heating a composition of claim 8 until it is thermoplastic and then shaping it into a product.

13. A biodegradeable moldable composition comprising a compatible thermoplastic blend of a biodegradable starch ester having a degree of substitution of about 1.1 to about 2.5 DS and an amylose content of at least 50% consisting of corn starch, potato starch, tapioca starch, rice starch, wheat starch, pea starch, rye starch, oats starch, and barley starch, and a biodegradable polyester selected from the group consisting of poly(6-caprolactone), poly(lactic acid), poly(glycolic acid), poly(hydroxy butyric acid), poly(hydroxy isobutyric acid), poly(hydroxy valeric acid), poly(hydroxybutyrate-co-valerate) and polyesters derived from hydroxy-carboxylic acids having the formula:

HO—$(C_nH_{2n})$—COOH where n is an integer from 1 to 21.

14. A product as set forth in claim 13 further including a plasticizer selected from the group consisting of glyceryl triacetate, triethyl citrate, acetyl triethyl citrate, tributyl citrate, acetyl tributyl citrate, diethyl phthalate, glyceryl tribenzoate, N-ethyl-o,p-toluene sulfonamide, dimethyl sebacate, dibutyl sebacate, pentaerythritol tetraacetate, pentaerythritol tetrabenzoate, and diethyl succinate.

* * * * *

UNITED STATES PATENT AND TRADEMARK OFFICE
CERTIFICATE OF CORRECTION

PATENT NO.        : 7,517,924 B1                                    Page 1 of 1
APPLICATION NO.   : 08/367370
DATED             : April 14, 2009
INVENTOR(S)       : Rimsa et al.

It is certified that error appears in the above-identified patent and that said Letters Patent is hereby corrected as shown below:

On the front page, section OTHER PUBLICATIONS, please replace "Industiral Eng. Chem." with -- Industrial Eng. Chem. --.

In the description, at column 6, line 23, please replace "ethylene/vinyl acetate-copolymars" with -- ethylene/vinyl acetate copolymers --.

In claim 1, at column 11, line 67, please replace "poly(hydmxybutyrate-co-valerate)" with -- poly(hydroxybutyrate-co-valerate) --.

In claim 9, at column 13, line 30, please replace "compostion" with -- composition --.

In claim 10, at column 14, line 1, please replace "compostion" with -- composition --.

In claim 13, at column 14, line 8, please replace "biodegradeable" with -- biodegradable --.

Signed and Sealed this

Twenty-seventh Day of October, 2009

David J. Kappos
*Director of the United States Patent and Trademark Office*